United States Patent [19]

Ruff et al.

[11] 4,067,155
[45] Jan. 10, 1978

[54] SEALING SYSTEM

[75] Inventors: David L. Ruff, Torrance; Sherman A. Stewart, Palos Verdes Penn.; Harlan E. Tarbell, Torrance, all of Calif.

[73] Assignee: Grefco, Inc., Bala Cynwyd, Pa.

[21] Appl. No.: 608,751

[22] Filed: Aug. 28, 1975

[51] Int. Cl.² .............................................. E04B 1/00
[52] U.S. Cl. .......................................... 52/105; 52/288;
52/303; 52/309.2; 52/309.16; 52/395; 52/461;
52/466; 52/468; 52/573
[58] Field of Search .................. 52/105, 468, 573, 466,
52/461, 463, 364, 464, 403, 467, 400, 395, 459,
402, 287, 288, 303, 309.2, 309.7, 309.16;
248/205 A; 151/41.7, 14.5

[56] References Cited

U.S. PATENT DOCUMENTS

| | | | |
|---|---|---|---|
| 1,156,351 | 10/1915 | Duffy | 52/461 |
| 2,230,688 | 2/1941 | Irwin | 52/288 |
| 2,412,401 | 12/1946 | Holm-Hansen | 52/472 |
| 2,439,516 | 4/1948 | Holcomb | 85/28 X |
| 3,077,213 | 11/1961 | Hobbs | 52/287 |
| 3,100,951 | 8/1963 | Hickman | 52/543 |
| 3,199,258 | 8/1965 | Jentoft et al. | 52/282 |
| 3,213,584 | 10/1965 | Bush | 52/400 |
| 3,229,441 | 1/1966 | Heffner | 52/743 |
| 3,230,817 | 1/1966 | Thomas | 85/28 |
| 3,286,422 | 11/1966 | Pangerl | 52/287 |
| 3,292,330 | 12/1966 | Tennison | 52/403 |
| 3,303,626 | 2/1967 | Brigham | 52/586 |
| 3,339,329 | 9/1967 | Berg | 52/395 |
| 3,381,436 | 5/1968 | Elliott et al. | 52/468 |
| 3,408,786 | 11/1968 | Snyker | 52/420 X |
| 3,427,776 | 2/1969 | Lake et al. | 52/403 |
| 3,469,490 | 9/1969 | Pearce, Jr. | 151/41.7 X |
| 3,470,598 | 10/1969 | Berthelsen | 53/309.16 X |
| 3,508,369 | 4/1970 | Tennison | 52/396 |
| 3,553,915 | 1/1971 | Passovoy | 52/241 |
| 3,570,205 | 3/1971 | Payne | 52/466 |
| 3,604,169 | 9/1971 | Smith | 52/396 |
| 3,605,368 | 9/1971 | Lalouche | 52/460 |
| 3,646,720 | 3/1972 | Watts | 52/303 X |
| 3,665,666 | 5/1972 | Delcroix | 52/468 X |
| 3,667,177 | 6/1972 | Biela | 52/278 |
| 3,688,460 | 9/1972 | Van Loghem | 52/466 |
| 3,694,976 | 10/1972 | Warshaw | 52/573 X |
| 3,696,575 | 10/1972 | Armstrong | 52/287 |
| 3,711,347 | 1/1973 | Wagner et al. | 151/14.5 X |
| 3,750,523 | 8/1973 | Fujita | 85/28 |
| 3,760,544 | 9/1973 | Hawes | 52/468 |
| 3,881,290 | 5/1975 | Bouchey | 52/400 X |
| 3,931,699 | 1/1976 | Sarvay | 52/403 |

FOREIGN PATENT DOCUMENTS

| | | | |
|---|---|---|---|
| 769,347 | 10/1967 | Canada | 52/288 |
| 1,064,228 | 8/1959 | Germany | 52/463 |
| 1,925,577 | 11/1970 | Germany | 53/730 |
| 10,012 of | 1906 | United Kingdom | 53/543 |

Primary Examiner—Leslie Braun
Attorney, Agent, or Firm—Everett H. Murray, Jr.; Brian G. Brunsvold; Dennis P. O'Reilley

[57] ABSTRACT

A system for joining and adhering a pair of abutting panels to a rigid substrate and providing a seal against thermal and moisture transfer. The system is comprised of an elongated receptacle member with a base and a pair of spaced vertical elements extending upwardly from the base and forming a channel, to be placed under and between edges of the panels to be joined. The receptacle member is firmly attached to the rigid substrate by fastening means passed through the base. The adjacent side walls of the vertical elements include a plurality of vertically spaced, downwardly angled teeth projecting inwardly towards the center of the channel. An elongated resilient insert member includes a cap and a projection extending downwardly from said cap. The opposed side wall surfaces of the projection include a plurality of vertically spaced, upwardly angled teeth projecting outward from said projection a sufficient distance to engage the downwardly angled teeth of the receptacle member when the projection is inserted in the channel. The cap of the insert member has a convex upper surface and a concave lower surface so that when the projection of the insert member is inserted in the receptacle member, the resilience of the cap exerts a slight upward force on the projection providing a positive engaging force that tends to lock the projection in the receptacle member. A layer of adhesive-sealant is attached to the lower concave surface of the cap on each side of the projection and is disposed to contact and seal the cap to the panels to be joined.

14 Claims, 8 Drawing Figures

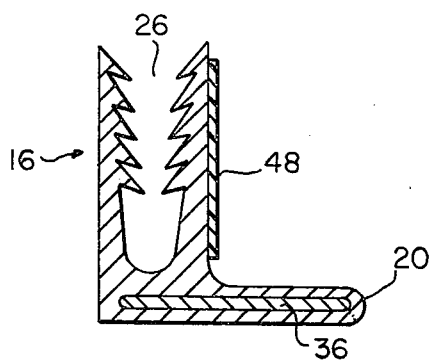
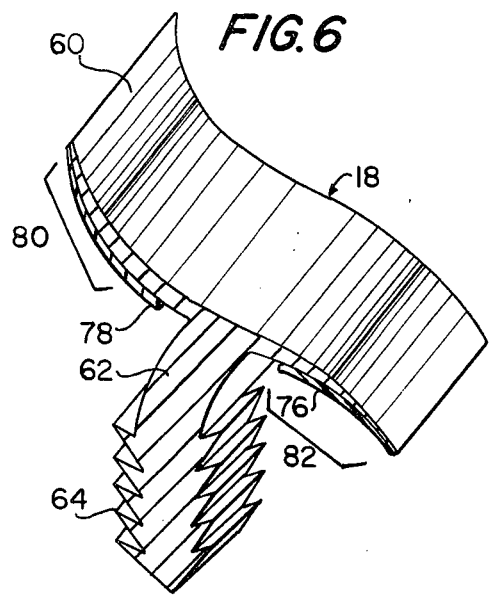
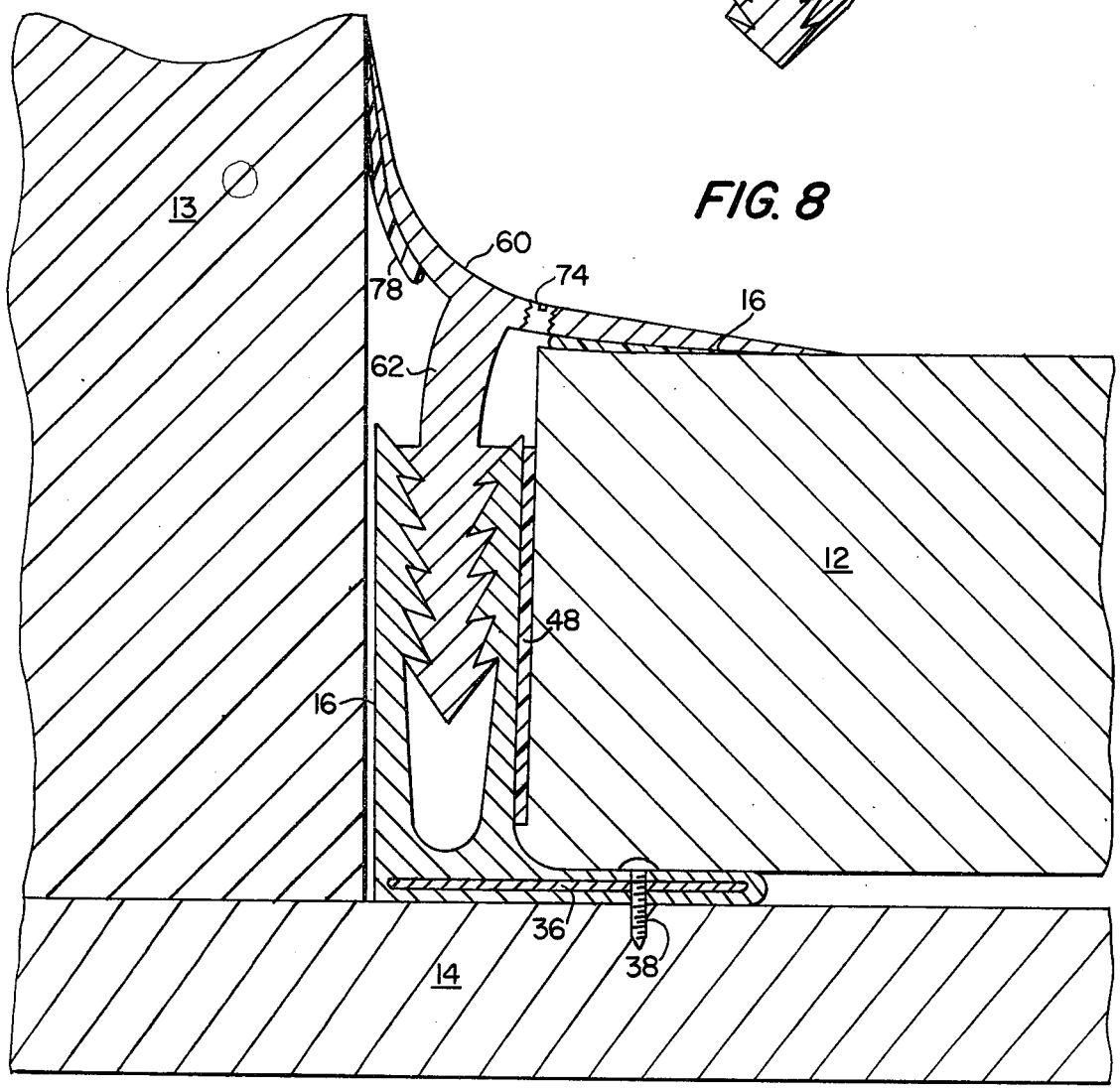

SEALING SYSTEM

BACKGROUND OF THE INVENTION

This invention relates to the joining of roof or wall panels and the firm attachment of them to a rigid substrate while providing a temperature and moisture seal at the joints. More particularly, the invention relates to an uncomplicated means of providing a secure, sealed joint between construction panels.

The effective and efficient installation of panels to cover and insulate exterior walls and roofs of buildings presents several problems. First of all, it is desirable to minimize the number of steps to install the panels. It must not require an inordinate amount of time to properly align the panels for installation. The amount of equipment necessary to install panels should ideally, be no more than a hammer or screwdriver.

Additionally, the system used for installing the panels should be economical. Waste due to errors in installation, additional cost due to special design or rigid specification requirements for the panels, and specially designed panels rendered unusable due to edge damage in transit should be minimized by the system used for installation.

Obviously, the cost of the devices and materials used for installation of panels should be low. This, however, must be balanced with the system's effectiveness. The system used, besides being easy to install and economical, must provide secure attachment to the roof or wall and an effective seal against moisture and temperature transfer, at the joints formed by abutting panels. The means of attachment must resist loosening of panels through wind action or thermal expansion-contraction. Furthermore, the seal must prevent the transfer of external moisture and the accumulation of internal condensation; the seal must be maintained when the panels contract or shift slightly.

No one system has previously provided solutions to all of the enumerated problems. Some of the systems provided an adequate seal but required the panels to be attached by other means. These required additional steps in the installation of panels. A common method was to insert a liquid sealant into the gap between abutting panels and then cover the joint with a protective tape. In addition to the extra, time-consuming steps involved, the work was delayed because, typically, the sealant had to cure before workers could traverse the joints. Also, there was no way to insure adequate, uniform application of the sealant because of variation in the experience and skill of the workmen installing the roof. Furthermore, the sealant would deteriorate due to exposure to the weather thus requiring use of a protective tape which was susceptible to damage from workers walking on it. To overcome the latter disadvantage, some systems provided a thermoplastic insert which covered the sealant. In combination with the sealant, the thermoplastic cover provided a reasonably effective seal, but the installation was still hampered by the extra steps required and the additional equipment necessary to insert the sealant.

Many of the previous systems required specially designed panels with edges containing rabbets, grooves, extended flanges, or channels for the insertion of part of the sealing or joining system. In addition to the extra cost of the panels, they required extra care in transport and installation to preclude damage to their edges. The panels which required the insertion of part of the system in the panel edge prior to their installation were uneconomical and inefficient due to the extra, time-consuming step.

Some of the systems previously used required a specially designed substrate having grooves along the line where the panels would abut. Besides the increased cost of this construction, the installation of the panels was made more difficult as the panels had to be aligned with the pre-placed grooves.

Many of the systems which purported to provide a moisture seal at the joints were not effective due to gaps remaining under the sealant where condensation could accumulate. Furthermore, most of the moisture seal systems made no provision for a thermal seal. If the panels were installed on a thermal conductive substrate for insulation purposes, the insulation was much less effective due to thermal conduction at the panel joints.

Some prior art systems designed to join panels and attach them to substrates had design defects which permitted loosening of the panels due to wind action or thermal contraction. Besides leaving the panels loose, the system becomes ineffective as a seal since the sealant used, if any, was not flexible enough to compensate for the movement of the panels.

Many of the previously used systems were designed only for use with panels of uniform thickness. Panels manufactured to meet rigid wall thickness specification requirements for use in such systems are necessarily more expensive. Furthermore, if panels of different thicknesses were installed, the joint was not secure nor properly sealed.

Simplicity of installation was another factor not considered by many of the previous systems. The more complicated the system or the more exact the installation had to be the greater likelihood that the average worker would improperly install it. An example of such a system is the type which required the placing of a solidified strip of sealant material over the panel joint before inserting the top part of the system into the receiving part located between the edges of the abutting panels. This system required accurate alignment of the sealant strip and correct insertion of the top part through the sealant into the receiving part. Were the sealant strip misaligned, the seal would be ineffective. Furthermore, once the top part was inserted, it was difficult, if not impossible, to remove it to realign the sealant.

Also, in the prior art, there are many systems designed only for internal and/or temporary use which are not adaptable for permanent use as an attaching and sealing system for exterior roof and wall panels.

BRIEF DESCRIPTION OF THE INVENTION

The system of this invention comprises an elongated receptacle member of substantially constant cross-section including a base and a pair of spaced vertical elements extending upward from the base to define a channel. The adjacent side walls of the vertical elements include a plurality of vertically spaced, downwardly angled teeth projecting inwardly towards the center of the channel. The sealing strip forms an expansion joint for panels placed in abutting contact with the exposed face of the sealing strip. An elongated resilient insert member of substantially constant cross-section includes a cap, and a projection extending downwardly from the cap. A substantial portion of both side wall surfaces of the projection include a plurality of vertically spaced, upwardly angled teeth projecting outward from the side wall surfaces a sufficient distance to engage the downwardly angled teeth of the receptacle member when the projection is inserted in the channel. The cap has a convex upper surface and a concave lower surface so that when the projection of the insert member is inserted in the receptacle member, the resilience of the cap exerts a slight upward force on the projection to provide a positive engaging force that tends to lock the insert member in the receptacle member. A layer of tacky sealant is attached to the lower concave surface of the cap on each side of the projection.

Preferably, the insert member and receptacle member consist of an extruded thermoplastic material, such as nenitent polyvinylchloride.

In another embodiment, the receptacle member may be an extruded aluminum alloy.

It is also preferred that the receptacle member be an extruded thermoplastic material, such as nenitent polyvinylchloride, having a reinforcing plate embedded in its base.

Preferably, the reinforcing plate is steel embedded in the base of the receptacle member during the forming of the receptacle member. The reinforcing plate includes a plurality of holes for the passage of fastening means. The holes in the plate are preferably arranged in three spaced rows parallel to the longitudinal center line of the plate with each outer row of holes aligned adjacent a longitudinal edge of the plate and the center row of holes aligned substantially along the center line of the plate. The rows of holes are preferably offset such that the holes relate to each other as the corners of equilateral triangles.

It is also preferred that the tacky sealant on the cap be butyl adhesive-sealant tape.

In other desired embodiments, a sealant may be placed on the opposed side walls of the vertical elements of the receptacle member. Preferably the sealant is compressible polymeric foam containing a tacky adhesive.

It is also preferred that the cap of the insert member have removable screw plugs located on both sides of the longitudinal centerline of the insert member and spaced along the length of the cap.

From the description it can be seen that the invention is intended to provide a simple, economical system for joining, effectively sealing, and firmly attaching roof and wall panels which will obviate or minimize the disadvantages of previous systems.

This invention provides a system which can be installed in a minimum number of steps by providing joining elements containing pre-measured sealant thus precluding separate installation of sealant, its associated equipment, and its untidy and uneven application.

This invention also provides a system for joining roof and wall panels of ordinary construction without requiring the use of specially designed panel edges or substrate.

This invention is intended to provide a system for joining roof panels which, after installation, may be immediately traversed without damage to the joint or seal.

This invention is also intended to provide a means of sealing leaks at the joint which may develop after installation of the system without having to dismantle the system or having to use a messy, ineffective remedial method.

BRIEF DESCRIPTION OF DRAWINGS

The invention consists in the novel parts, constructions, arrangements, combinations and improvements shown and described. The accompanying drawings, which are incorporated in and constitute a part of this specification, illustrate two embodiments of the invention and, together with the description, serve to explain the principles of the invention.

Of the drawings:

FIG. 6 is a perspective sectional view of another embodiment of an insert member for use in a system designed to seal planar panels having their exterior surfaces intersecting an angle.

FIG. 7 is a perspective sectional view of a receptacle member for use with the insert member of FIG. 6.

FIG. 8 is a sectional view of the embodiments of FIGS. 6 and 7 fully installed.

DETAILED DESCRIPTION OF THE INVENTION

Reference will now be made in detail to presently preferred embodiments of the invention, examples of which are illustrated in the accompanying drawings.

Figure 2:
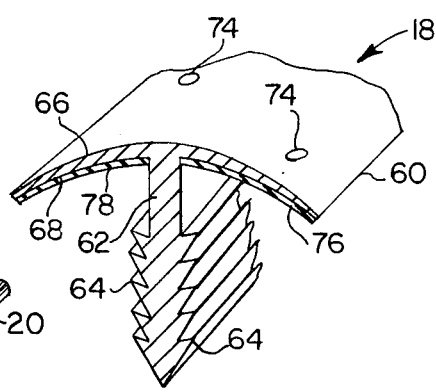
FIG. 2 is a perspective sectional view of one embodiment of the insert member for use with the receptacle member of FIG. 1.
Figure 3:
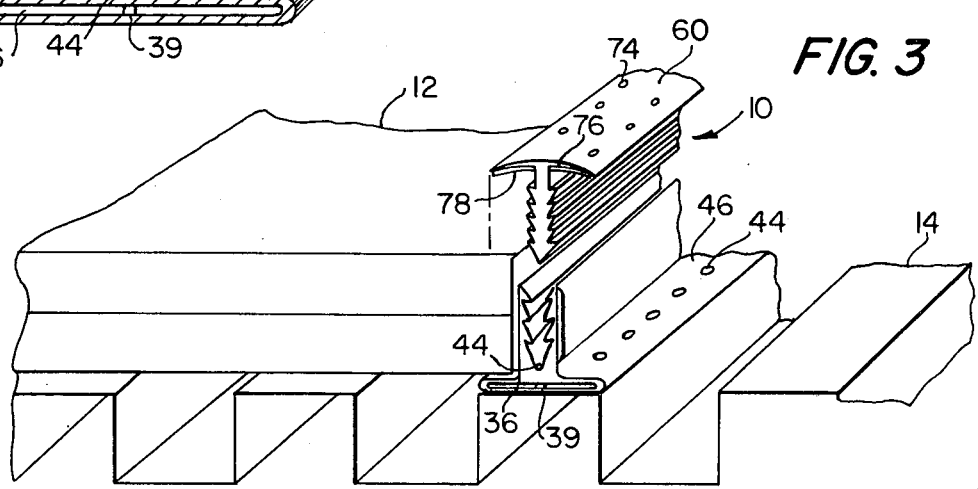
FIG. 3 is a perspective view of the embodiments of FIGS. 1 and 2 in position for installation with one panel removed for clarity.
Figure 4:
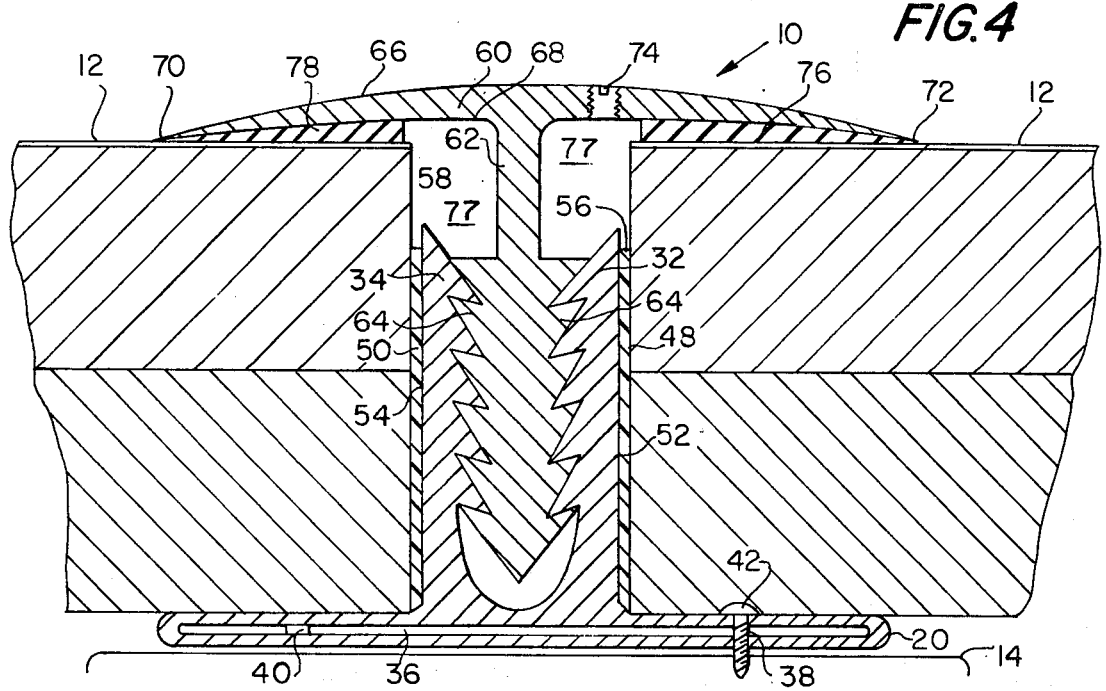
FIG. 4 is a cross-sectional view of the embodiments of the previous figures fully installed.

As may be seen in FIGS. 3 and 4, the system 10 generally provides a simple, effective means of joining and adhering panels 12 to a rigid substrate 14. The system includes a receptacle member generally 16 (FIG. 1) and an insert member generally 18 (FIG. 2).

Figure 1:
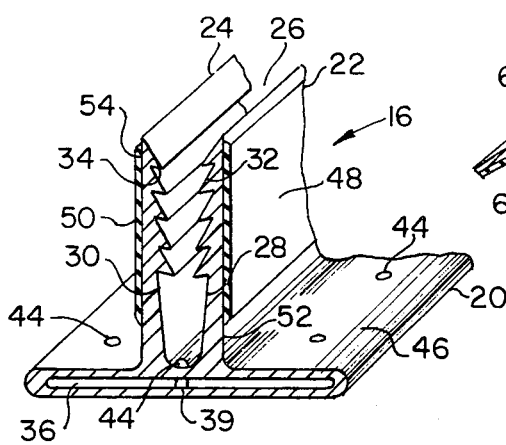
FIG. 1 is a perspective sectional view of one embodiment of a receptacle member disposed to seal planar panels having their exterior surfaces in substantially the same plane.

The elongated receptacle member 16, as shown in FIG. 1, includes a base 20 and a pair of vertical elements 22 and 24 extending upwardly from base 20 to define a channel 26. The adjacent interior side walls 28 and 30 of the vertical elements 22 and 24 include a plurality of vertically spaced, downwardly angled teeth 32 and 34 projecting inwardly towards the center of the channel 26.

Figure 5:
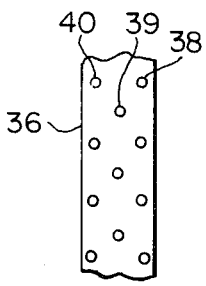
FIG. 5 illustrates a preferred configuration of the reinforcing plate prior to its fabrication within the base.

Preferably, a reinforcing plate 36 is embedded in the base 20. In a preferred embodiment of a reinforced base, as illustrated in FIG. 5, plate 36 has three rows of holes 38, 39 and 40 pre-drilled or pre-punched into the plate 36 before extrusion into the base 20. These holes are for the passage of fastening means 42 as shown in FIG. 4.

Preferably, the three rows of holes 38, 39 and 40 (FIG. 5) are substantially parallel to the longitudinal center line of the base 20. As can be seen in FIG. 5, the rows of holes 38, 39 and 40 are arranged with the outer rows 38 and 40 aligned adjacent a longitudinal edge of the plate 20 and the center row 39 is substantially on the longitudinal center line of the plate 20. The holes in the separate rows 38, 39 and 40 are preferably arranged such that they relate to each other as the corners of equilateral triangles.

As here embodied and as best seen in FIG. 1, the holes 38, 39, and 40 in the plate 36 create indentations 44 in the outer surface of base 20 when the base is formed by extrusion. Indentations 44 provide a means by which the individual performing the installation can accurately and quickly locate the embedded holes.

As shown in FIGS. 1 and 4, a pair of tacky, compressible sealing strips 48 and 50 may be attached one to each of the opposed exterior side walls 52 and 54 of the vertical elements 22 and 24. The sealing strips 48 and 50 form an expansion joint for panels 12 placed in abutting contact with the exposed face of the sealing strips. While the sealing of the side walls 52 and 54 is preferred because it provides a completely sealed structure, complete sealing is not always necessary for some applications of the invention.

The elongated, resilient insert member 18, as seen in FIG. 2, includes a cap 60 and a projection 62 which includes on each of its spaced side wall surfaces a plurality of vertically spaced, upwardly angled teeth 64. The upwardly angled teeth 64 extend outward from the side wall surfaces of the projection 62 a sufficient distance to engage the downwardly angled teeth 32 and 34 of the receptacle member 16 when the projection 62 is inserted into the channel 26; this engagement is illustrated in FIG. 4.

In order to promote an effective external seal, the configuration of the resilient cap is selected to exert a compressive force on the sealing means adhered to the interior wall surface of the cap on each side of the projection when the cap is deformed upon installation in the receptacle member. The sealing means are then forced into adhering contact with the surface of the panel to be sealed. The force provided by flexure of the resilient deformable cap also provides an upward force on the projection so that the teeth on the projection engage the teeth in the base and provides a secure engagement not susceptible to removal or loosening.

In the embodiments of FIGS. 1 through 4, the cap 60 has a convex upper surface 66 and a concave lower surface 68. This design of the resilient cap 60 provides for the upward force on the projection 62 when it is fully inserted in the receptacle member as shown in FIG. 4, and is particularly suited for use in joining panels that are aligned in the same plane.

An additional advantage to design of curved cap 60 is that it permits the joining of two panels 12 of uneven thickness while achieving the same security and seal.

In the embodiments of FIGS. 6 through 8, the cap 60 has a different configuration due to the different angular disposition of the panel surfaces to be sealed. If the material of the cap 60 is sufficiently pliable, the cap 60 for use in the sealing of angularly abutted panels may have the same configuration as previously described for the embodiments of FIGS. 1 through 4. Preferably, however, cap 60 has a permanent shape as shown in FIG. 6 for use in joining panels disposed at right angles. In FIG. 6, the portion 80 that is to contact the panel 13 parallel to the channel 26 in the base 20 is concave on its external surface and convex on its internal surface. The portion 82 that contacts the panel 12 which is positioned perpendicular to the channel 26 in the base 20 is concave on the surface contacting the panel and convex on its exterior surface. This configuration allows the cap to conform to the angular junction of the panels without excessive flexure of the cap 60 or the projection 62. The contacting portions 80 and 82 include sealing material depicted in FIGS. 6 and 8 as sealing strips 76 and 78.

FIG. 7 shows another embodiment of the base 20 particularly desired for use in a system in which a horizontal panel is positioned with its end surface in contact with sealing strips 48.

FIG. 8 shows the embodiment of FIGS. 6 and 7 fully assembled in a manner to seal the juncture of two panels 12 and 13 meeting at right angles. In this configuration, a compressive force is applied to the cap 60 and its two sealing portions 80 and 82 by flexure of the resilient cap during its installation. When projection 62 is inserted into the channel, teeth 64 on projection 62 lock the projection in place and help prevent the naturally resilient cap from returning to its normal shape. As the cap attempts to return to its normal shape, it exerts a compressive force on the sealing strip and ensures tight engagement of teeth 64 with teeth 32 and projection 62.

Preferably, the cap 60 will contain a plurality of screw plugs 74 which are inserted in threaded openings, as seen in FIGS. 2, 3, 4 and 8. The screw plugs 74 are spaced on lines parallel and adjacent to the edges of the cap 60. The plugs 74 are located on both sides of the longitudinal center line of the cap 60 in order to be over the void space 77 (best seen in FIG. 4) created on insertion of the insert member. The screw plugs 74 serve as access to the void space 76 for filling with a sealant should leaks develop after installation of the system. This is an added advantage of the present invention since leaks which arise after installation can be sealed without having to disassemble the joint or without having to use some messy, ineffective remedial method of resealing the joint.

A layer of tacky sealant 76 and 78, as seen in FIGS. 2, 3, 4, 6 and 8, is attached to the lower surface 68 of the cap 60 on each side of the projection 62. These seals 76 and 78 provide a resilient thermal and moisture seal between the edges of the cap 70 and 72 and the panels 12 or 13. In addition, the tackiness holds the seals 76 and 78 in place, adds additional security by holding the insert member 18 in place, and minimizes the lateral movement of the panels 12 thus assisting the seals 48 and 50.

In embodiments using sealing strips either on the receptacle members or the resilient caps, it is preferred that the sealing strips be comprised of a tacky polymeric foam material. A specific example of such a material is urethane foam containing a tacky adhesive throughout and seals of compressible polyvinylchloride containing a tacky adhesive are also operable with the invention.

It is also preferred that the sealing strips 76 and 78 be comprised of butyl adhesive-sealant tape.

Preferably, the insert 18 and receptacle 16 members are of an extruded thermoplastic material such as nenitent polyvinylchloride. Other desirable materials for the receptacle member 16 include aluminum alloys.

The invention provides a system for economically and efficiently joining and adhering roof or wall panels to a rigid substrate while providing an effective thermal and moisture seal.

It will be apparent to those skilled in the art that various modifications and variations could be made to the elements of the system of this invention without departing from the scope and spirit of the invention.

What is claimed is:

1. A system for joining and adhering a pair of panels to a rigid substrate and providing a seal against thermal and moisture transfer comprising:

a. an elongated receptacle member of substantially constant transverse cross-section for attachment to said rigid substrate including a base, and a pair of spaced vertical elements extending upwardly from said base to define a channel, the adjacent side walls of said vertical elements including a plurality of vertically spaced, downwardly angled teeth projecting inwardly towards the center of said channel;

b. a reinforcing metal plate embedded in the base of said receptacle member providing for the secure attachment of said receptacle member to said rigid substrate, said plate including a plurality of holes for passage of fastening means and the surface of said base including indentations that are formed adjacent said holes;

c. an elongated resilient insert member of substantially constant transverse cross-section including a cap, and a projection having a pair of spaced side wall surfaces extending downwardly from said cap, a portion of both of said side wall surfaces including a plurality of vertically spaced, upwardly angled teeth projecting outwardly from said side walls a sufficient distance to engage the downwardly angled teeth of said receptacle member when said projection is inserted in said channel, said cap being deformable upon insertion of said projection of said insert member in said receptacle member, with the resilience of said cap providing a slight upward force on said projection to exert a positive, engaging force that tends to lock said projection in said receptacle member; and d. a layer of tacky resilient sealant attached to the lower surface of said cap on each side of said projection to seal said cap to each of said panels.

2. The system of claim 1 wherein said receptacle member includes a tacky resilient sealing strip attached to at least one outside side wall of one of said vertical elements, said sealing strip forming an expansion joint for a panel placed in abutting contact with the exposed face of said sealing strip.

3. The system of claim 2 wherein said tacky resilient sealing strip on the side wall of the vertical elements of the receptacle member is compressible urethane containing a tacky adhesive throughout.

4. The system of claim 2 wherein said tacky resilient sealing strip on the side wall of the vertical elements of the receptacle member is compressible polyvinylchloride foam containing a tacky adhesive throughout.

5. The system of claim 1 wherein said cap has a convex outer surface and a concave inner surface for joining panels lying in the same plane.

6. The system of claim 1 wherein said cap has a first portion disposed to seal a plane parallel to said channel, said first portion being concave on the external surface and convex on the internal surface and a second portion disposed to seal a panel perpendicular to said channel, said second portion convex on the external surface and concave on the internal surface for joining panels that intersect at right angles.

7. The system of claim 1 wherein the receptacle member and the insert member consist of extruded thermoplastic material.

8. The system of claim 7 wherein the thermoplastic material is renitent polyvinylchoride.

9. The system of claim 1 wherein the receptacle member is an extruded aluminum alloy.

10. The system of claim 1 wherein said holes in said reinforcing plate are arranged in three spaced rows parallel to said plate's longitudinal center line; each outer row of holes is aligned adjacent a longitudinal edge of said plate; the center row of holes is aligned substantially along the longitudinal center line of said plate; said rows are offset with respect to each other such that said holes relate to each other as the corners of equilateral triangles.

11. The system of claim 1 wherein said tacky resilient sealant attached to the lower surface of said cap is a butyl adhesive-sealant tape.

12. The system of claim 1 wherein the cap of said insert member has removable screw plugs located on both sides of the longitudinal center line of said insert member, and spaced along the length of said cap.

13. A roof insulation system for joining and adhering a pair of roofing panels to a rigid substrate and providing a seal against thermal and moisture transfer comprising:

a. an elongated receptacle member formed of extruded, renitent, resilient thermoplastic material, said member having a substantially constant transverse cross-section for attachement to said rigid substrate including a base, and a pair of spaced, vertical elements extending upwardly from said base to define a channel, the adjacent side walls of said vertical elements including a plurality of vertically spaced, downwardly angled teeth projecting inwardly toward the center of said channel;

b. an elongated insert member formed of extruded, renitent, resilient thermoplastic material having a substantially constant transverse cross-section including a cap having a substantially smooth top surface, and a projection having a pair of spaced wall surfaces extending downwardly from said cap, a portion of both of said side wall surfaces including a plurality of vertically spaced, upwardly angled teeth projecting outwardly from said side walls a sufficient distance to engage the downwardly angled teeth of said receptacle member when said projection is inserted in said channel, said cap being deformable upon insertion of said projection of said insert member in said receptacle member, the resilience of said cap providing a slight upward force on said projection to exert a positive, engaging force that tends to lock said projection in said receptacle member and resists the inadvertent loosening or removal of said insert member;

c. a steel reinforcing plate embedded within the base of said receptacle member during the extrusion forming said receptacle member providing for the attachment of said receptable member to said rigid substrate, the steel plate including a plurality of uniformly spaced holes for the passage of fastening means and the surface of the receptacle member base including indentations that are formed adjacent said holes during extrusion;

d. a layer of tacky, resilient sealant attached to the lower surface of said cap on each side of said projection to seal said cap to each of said panels substantially reducing thermal and moisture transfer between said panels and said cap and resisting movement of said panels relative to said insulation system; and e. a homogeneously mixed adhesive-resilient sealing material attached to the outside wall of at least one of said vertical elements, said sealing material forming an expansion joint for a panel placed in abutting contact with the exposed surface of said sealing material and providing a thermal and moisture seal between said panel and said sealing system, said expansion joint permitting temporary movement of said roofing panels caused by thermal or atmospheric changes but resisting permanent movement of said panel relative to said sealing system.

14. The system as in claim 13 wherein the cap of said insert member has flush-mounted, removable screw plugs located on both sides of the longitudinal center line of said insert member and spaced along the length of the cap providing access to the space beneath said cap after insertion of said inert member in said receptacle member for injection of viscous insulating material.

* * * * *

UNITED STATES PATENT AND TRADEMARK OFFICE
CERTIFICATE OF CORRECTION

PATENT NO. : 4,067,155
DATED : January 10, 1978
INVENTOR(S) : David L. Ruff et al It is certified that error appears in the above-identified patent and that said Letters Patent are hereby corrected as shown below:

Claim 13, column 8, line 21, change "attachement" to --attachment--.

Claim 14, column 10, line 6, change "inert" to --insert--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks